United States Patent
Kamiyama et al.

(10) Patent No.: US 7,487,747 B2
(45) Date of Patent: Feb. 10, 2009

(54) MOUNT APPARATUS FOR VARIABLE COMPRESSION RATIO INTERNAL COMBUSTION ENGINE

(75) Inventors: Eiichi Kamiyama, Mishima (JP);
Masaaki Kashiwa, Gotemba (JP);
Daisuke Akihisa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/582,158

(22) PCT Filed: May 13, 2005

(86) PCT No.: PCT/JP2005/009202

§ 371 (c)(1),
(2), (4) Date: Jun. 8, 2006

(87) PCT Pub. No.: WO2005/110792

PCT Pub. Date: Nov. 24, 2005

(65) Prior Publication Data

US 2007/0045030 A1    Mar. 1, 2007

(30) Foreign Application Priority Data

May 17, 2004   (JP)   ............................. 2004-146669

(51) Int. Cl.
*F02B 75/04* (2006.01)
(52) U.S. Cl. .................. 123/48 C; 123/78 C
(58) Field of Classification Search .............. 123/48 R, 123/48 C, 78 R, 78 C
See application file for complete search history.

(56) References Cited

U.S. PATENT DOCUMENTS

| 5,129,479 A | 7/1992 | Fujii et al. |
| 2004/0046450 A1 | 3/2004 | Yoshida et al. |

FOREIGN PATENT DOCUMENTS

| JP | U-56-097124 | 8/1981 |
| JP | U-57-132051 | 8/1982 |
| JP | U-63-125619 | 8/1988 |
| JP | U-03-122242 | 12/1991 |
| JP | A-04-015122 | 1/1992 |
| JP | A-04-365630 | 12/1992 |
| JP | A-05-203019 | 8/1993 |
| JP | A-07-026981 | 1/1995 |
| JP | B2-2760108 | 5/1998 |
| JP | B2-3224816 | 8/2001 |
| JP | A-2003-206771 | 7/2003 |
| JP | A-2003-312273 | 11/2003 |
| WO | WO 92/09798 A1 | 6/1992 |
| WO | WO 00/55483 | 9/2000 |

*Primary Examiner*—Noah Kamen
(74) *Attorney, Agent, or Firm*—Oliff & Berridge, PLC

(57) ABSTRACT

An internal combustion engine 1 in which the compression ratio can be varied by moving a cylinder block and a crankcase along the axial direction of the cylinder is mounted on a vehicle body member 29 by at least two portions including a first mount portion 32 provided on a transmission apparatus to and a second mount portion 31 provided on the internal combustion engine 1, wherein said second mount portion 31 is provided on the crankcase 4. The first mount portion 32 and the second mount portion 31 are arranged in such a way that the direction of a rotation moment TD about the output shaft RC1 of the transmission apparatus acting on the internal combustion engine 1 upon combustion becomes opposite to the direction of a rotation moment M1 about the output shaft RC1 generated by a force acting on a cylinder block 3 upon changing the compression ratio.

6 Claims, 6 Drawing Sheets

MOUNT APPARATUS FOR VARIABLE COMPRESSION RATIO INTERNAL COMBUSTION ENGINE

TECHNICAL FIELD

The present invention relates to a mount apparatus for mounting a variable compression ratio internal combustion engine in which the compression ratio can be varied, to a vehicle body member.

BACKGROUND ART

In recent years, for the purpose of improving performance of internal combustion engines in terms of gas mileage and output power etc., technologies that enable to vary the compression ratio of internal combustion engines nave been proposed. For example, there has been disclosed a technology in which the cylinder block, which is an engine component that constitutes a combustion chamber of an internal combustion engine, and the crankcase are displaced relative to each other by rotationally driving a control shaft coupled to the cylinder block and the crankcase, thereby changing the volume of the combustion chamber to vary the compression ratio of the internal combustion engine (see, for example, Japanese Patent Application Laid-Open No. 2003-206771).

In another disclosed technology concerning an internal combustion engine in which the compression ratio of the internal combustion engine can be varied by swinging the cylinder block relative to the crankcase, a gear case and auxiliary machines are mounted on a side wall provided on the crankcase to simplify the mounting process while utilizing a conventional type flange surface (see, for example, Japanese Patent No. 3224816).

DISCLOSURE OF THE INVENTION

As to the variable compression ratio internal combustion engine in which the compression ratio can be varied by relatively displacing the cylinder block and the crankcase with respect to the axial direction of the cylinder, a concrete way of mounting it on a vehicle body member has not been disclosed.

In addition, there is a risk that a force created upon changing the compression ratio in the above-described variable compression ratio internal combustion engine may be transmitted to the vehicle body through an apparatus for mounting on the vehicle body member to cause significant vibration of the vehicle body etc.

The present invention has been made in view of the above-described problem and has as an object to propose a concrete mode of a mount apparatus for mounting a variable compression ratio internal combustion engine in which the compression ratio can be varied by relatively displacing the cylinder block and the crankcase with respect to the axial direction of the cylinder on a vehicle body member, and to provide a mount apparatus with which vibration of the vehicle body can be suppressed more efficiently.

To achieve the above object, according to the present invention, firstly, in a mount apparatus for mounting on a vehicle body member, a variable compression ratio internal combustion engine in which the compression ratio can be varied by moving a cylinder block and a crankcase relatively along the axial direction of a cylinder, said variable compression ratio internal combustion engine is mounted on said vehicle body member by at least two portions including a first mount portion provided on a transmission apparatus to which a crankshaft is linked and a second mount portion provided on the variable compression ratio internal combustion engine in a state in which said cylinder block is located above said crankcase, and said second mount portion is provided on said crankcase.

In the above-mentioned variable compression ratio internal combustion engine (which will also be referred to simply as "the internal combustion engine" hereinafter), the volume of the combustion chamber is changed by moving the engine components of the cylinder block side (which components will also be referred to simply as "the cylinder block") such as a cylinder block and a cylinder head etc. and the engine components of the crankcase side (which components will also be referred to simply as "the crankcase") such as a crankcase, a crankshaft and a transmission apparatus etc. relative to each other along the axial direction of the cylinder(s), whereby the compression ratio is changed. Specifically, when the cylinder block and the crankcase are brought relatively remote from each other, the volume of the combustion chamber is increased, so that the compression ratio is decreased. In contrast, when the cylinder block and the crankcase are brought relatively close to each other, the volume of the combustion chamber is decreased, so that the compression ratio is increased.

The above-mentioned internal combustion engine is mounted on the vehicle body member in a state in which it is suspended by at least two portions including the first mount portion and the second mount portion and in a state in which the cylinder block is located above the crankcase. Here, the "above" position means, in a vehicle on which the internal combustion engine is mounted, the side opposite to the ground with which the vehicle is in touch. It is preferred that a vibration damping member such as an elastic member or a liquid seal member be used in the first mount portion and the second mount portion to suppress the transmission of vibration of the internal combustion engine to the vehicle body and to ensure more reliable mounting of the internal combustion engine to the vehicle body member.

In the mount apparatus for an internal combustion engine having the above-described structure, as the second mount portion is provided on the crankcase, when the compression ratio is changed, the cylinder block is displaced along the axial direction of the cylinder while the crankcase is fixed on the vehicle body member. Therefore, the compression ratio is changed by moving the cylinder block that has a relatively small weight, and it is possible to reduce the energy required for changing the compression ratio. In particular, by providing, using a spring or the like, a biasing force acting between the cylinder block and the crankcase in such a direction as to bias them away from each other, changing to a low compression ratio can be easily performed in the internal combustion engine, whereby it is possible to effectively suppress knocking involved by increases in the engine load of the internal combustion engine.

Secondly, to achieve the above-mentioned object, according to the present invention, in a mount apparatus for mounting on a vehicle body member, a variable compression ratio internal combustion engine in which the compression ratio can be varied by moving a cylinder block and a crankcase relatively along the axial direction of a cylinder, said variable compression ratio internal combustion engine is mounted on said vehicle body member by at least two portions including a first mount portion provided on a transmission apparatus to which a crankshaft is linked and a second mount portion provided on the variable compression ratio internal combustion engine in a state in which said cylinder block is located above said crankcase, and said second mount portion is provided on said cylinder block.

In the mount apparatus for an internal combustion engine having the above-described structure, as the second mount portion is provided on the cylinder block, when the compression ratio is changed, the engine components of the crankcase side are displaced along the axial direction of the cylinder while the engine components of the cylinder block side are fixed on the vehicle body member. Therefore, it is possible to utilize gravitational energy of the crankcase that has a relatively large weight in relatively moving the cylinder block and the crankcase away from each other. Thus, when the compression ratio is changed to the low compression ratio side by moving the cylinder block and the crankcase away from each other, it is possible to reduce the time required for the change. In particular, in order to suppress knocking that may be generated when the engine load of the internal combustion engine increases, it is preferred that the time required for decreasing the compression ratio be as short as possible. Therefore, the way of mounting the internal combustion engine by means of the above-described mount apparatus for the internal combustion engine is considered to be preferable, in the case where importance is placed on decreasing of the compression ratio in the internal combustion engine.

Thirdly, to achieve the above-mentioned object, according to the present invention, in a mount apparatus for mounting on a vehicle body member, a variable compression ratio internal combustion engine in which the compression ratio can be varied by moving a cylinder block and a crankcase relatively along the axial direction of a cylinder, said variable compression ratio internal combustion engine is mounted on said vehicle body member by at least two portions including a first mount portion provided on a transmission apparatus to which a crankshaft is linked and a second mount portion provided on the variable compression ratio internal combustion engine in a state in which said cylinder block is located above said crankcase, and said second mount portion is composed of a cylinder block side mount portion provided on said cylinder block and a crankcase side mount portion provided on said crankcase.

In the mount apparatus for an internal combustion engine having the above-described structure, by providing the cylinder block side mount portion and the crankcase side mount portion as the second mount portion, it is possible to achieve reduction of the load on each of the mount portions while compatibly achieving the advantageous effects of the above-described first and second aspects of the invention, that is, saving of the energy required for changing the compression ratio and reduction of the time required for changing the compression ratio by moving the cylinder block and the crankcase away from each other.

On the other hand, relative displacement of the cylinder block and the crankcase effected to change the compression ratio of the internal combustion engine is limited within the range in which elastic deformation of the second mount portion, or the cylinder block side mount portion and the crankcase side mount portion, is possible. For example, in the case where the aforementioned vibration damping members are used in the cylinder block side mount portion and the crankcase side mount portion, the compression ratio is changed within the range in which that vibration damping members can elastically deform.

Fourthly, to achieve the above object, according to the present invention, in a mount apparatus for mounting on a vehicle body member, a variable compression ratio internal combustion engine in which the compression ratio can be varied by moving a cylinder block and a crankcase relatively along the axial direction of a cylinder, said variable compression ratio internal combustion engine is mounted on said vehicle body member by at least two portions including a first mount portion provided on a transmission apparatus to which a crankshaft is linked and a second mount portion provided on the variable compression ratio internal combustion engine in a state in which said crankcase is located above said cylinder block, and said second mount portion is provided on said crankcase.

As per the above, in the mount apparatus for an internal combustion engine according to the fourth aspect of the invention, when the internal combustion engine is mounted by the first mount portion and the second mount portion, it is in an inverted state in which the cylinder block is located below the crankcase, contrary to the mount apparatus for an internal combustion engine according to the first to third aspects of the invention. In the mount apparatus for an internal combustion engine having the above-described structure, it is possible to shorten the time required for decreasing the compression ratio utilizing gravitational energy of the cylinder block that is located below the crankcase. In the case where the crankcase is moved upon changing the compression ratio while the cylinder block is mounted on the vehicle body member, it is possible to shorten the time required for decreasing the compression ratio utilizing gravitational energy of the crankcase, but it is necessary to change the positions of the crankshaft and the transmission apparatus etc. linked therewith. In contrast, in this invention, since the cylinder block is moved while the crankcase is mounted on the vehicle body member, it is not needed to change the positions of the crankshaft and the transmission apparatus etc. linked therewith.

In internal combustion engines mounted on a vehicle body member by a mount apparatus according to the first to fourth aspects of the present invention, engine power generated by combustion is transmitted by the transmission apparatus from its output shaft to wheels of the vehicle on which the internal combustion engine is mounted to drive the vehicle. Simultaneously, the wheels receive a reactive force from the ground, and the reactive force is transmitted from the wheels to the output shaft of the transmission apparatus, whereby a rotation moment on the output shaft is generated. This rotation moment acts as a torque that causes the internal combustion engine to turn about the output shaft.

On the other hand, when the cylinder block and the crankcase are moved relative to each other in order to change the compression ratio of the internal combustion engine, a force caused by that relative movement acts on the cylinder block or the crankcase that is mounted on the vehicle body member by the second mount portion. In other words, in the case where the second mount portion is provided on the cylinder block, that force acts on the cylinder block, while in the case where the second mount portion is provided on the crankcase, that force acts on the crankcase. Thus, a rotation moment about the output shaft of the transmission apparatus is generated by that force.

The above-mentioned rotation moments may sometimes have the same rotation direction depending on the attachment positions of the first mount portion and the second mount portion and orientation of the internal combustion engine as it is mounted on the vehicle. If this is the case, there is a risk that the rotation moments may cause vibration of the internal combustion engine and the vehicle on which it is mounted.

In view of this, in the mount apparatus for an internal combustion engine according to the first to fourth aspects of the present invention, orientation of said first mount portion, said second mount portion and said variable compression ratio internal combustion engine may be arranged in such a way that the direction of a rotation moment about the output shaft of said transmission apparatus that is generated upon combustion in the cylinder in said variable compression ratio internal combustion engine to act on the variable compression ratio internal combustion engine becomes opposite to the direction of a rotation moment about said output shaft generated by a force that acts on either said cylinder block or said crankcase on which said second mount portion is provided on a specific occasion of changing the compression ratio of said variable compression ratio internal combustion engine.

Here, the specific occasion of changing the compression ratio refers to the occasion on which a rotation moment about the output shaft of the transmission apparatus caused by a force generated by relative movement of the cylinder block and the crankcase is relatively large, and there is a risk that significant vibration of the vehicle on which the internal combustion engine is mounted can be caused by that rotation moment. The above-mentioned rotation moment becomes large especially when a low compression ratio is required upon combustion in the internal combustion engine, for example, when necessitated by a high engine load in the internal combustion engine, the compression ratio is decreased by bringing the cylinder block and the crankcase away from each other as early as possible in order to avoid knocking.

When the directions of the above-mentioned two rotation moments are arranged to be opposite to each other, the rotation moments will cancel each other, thereby making it possible to suppress vibration of the vehicle upon changing the compression ratio. Especially when the compression ratio is caused to decrease by bringing the cylinder block and the crankcase away from each other since the engine load of the internal combustion engine is high, the rotation moment caused by the relative movement of them becomes large as described above, and in addition the rotation moment caused by combustion also becomes large due to an increase in the engine output power. Therefore, it is preferred that the positions of the first mount portion and the second mount portion and orientation of the internal combustion engine be determined with reference to the rotation moment about the output shaft that is generated when the compression ratio is decreased by moving the cylinder block and the crankcase away from each other.

When the cylinder block and the crankcase are moved relatively to change the compression ratio of the internal combustion engine, a rotation moment about the mount axis that connects the first mount portion and the second mount portion is generated by a force created in the cylinder block or the crankcase that is mounted on the vehicle body member by the second mount portion. This rotation moment may sometimes have the same rotation direction as the rotation moment on the output shaft of the transmission apparatus that is generated by a reactive force that the wheels receive from the ground and is transmitted from the wheels to that output shaft, depending on the attachment positions of the first mount portion and the second mount portion and orientation of the internal combustion engine. If this is the case, there is a risk that these rotation moments may cause vibration of the internal combustion engine and the vehicle on which it is mounted.

In view of this, orientation of said first mount portion, said second mount portion and said variable compression ratio internal combustion engine may be arranged in such a way that the direction of a rotation moment about the output shaft of said transmission apparatus that is generated upon combustion in the cylinder in said variable compression ratio internal combustion engine to act on the variable compression ratio internal combustion engine becomes opposite to the direction of a rotation moment about the mount axis connecting said first mount portion and said second mount portion generated by a force that acts on either said cylinder block or said crankcase on which said second mount portion is provided on a specific occasion of changing the compression ratio of said variable compression ratio internal combustion engine.

Here, the specific occasion of changing the compression ratio has the same meaning as the aforementioned specific occasion of changing the compression ratio. When the directions of the above-mentioned two rotation moments are arranged to be opposite to each other, the rotation moments will cancel each other, thereby making it possible to suppress vibration of vehicle upon changing the compression ratio. Especially when the compression ratio is caused to decrease by bringing the cylinder block and the crankcase away from each other since the engine load of the internal combustion engine is high, the torque about the mount axis becomes large, and in addition the torque about the output shaft also becomes large due to an increase in the engine output power. Therefore, it is preferred that the positions of the first mount portion and the second mount portion and orientation of the internal combustion engine be determined with reference to the rotation moment about the mount axis that is generated when the compression ratio is decreased by moving the cylinder block and the crankcase away from each other.

In the mount apparatuses for an internal combustion engine described in the foregoing, the internal combustion engine may be an internal combustion engine for driving a vehicle of a front-engine front-drive type or a so-called FF type.

In the mount apparatuses for an internal combustion engine described in the foregoing, the line connecting said first mount portion and said second mount portion may constitute a principal axis of inertia that makes the moment of inertia of a drive apparatus composed of said variable compression ratio internal combustion engine and said transmission apparatus minimum, or lie within a predetermined range from said principal axis of inertia.

It is preferred that the line connecting the first mount portion and the second mount portion coincide with the principal axis of inertia, but their perfect coincidence may be sometimes difficult because of spatial limitations in mounting the internal combustion engine on the vehicle body member. In such cases, said predetermined range is set so that the line connecting the first mount portion and the second mount portion is located at a position as close to the principal axis of inertia as possible.

By providing the first mount portion and the second mount portion in the above described way, it is possible to suppress vibration occurring in the vehicle when the internal combustion engine vibrates about the line connecting the first mount portion and the second mount portion.

BEST MODE FOR CARRYING OUT THE INVENTION

Here, embodiments of the mount apparatus for a variable compression ratio internal combustion engine according to the present invention will be described with reference to the drawings.

Embodiment 1

Figure 1:
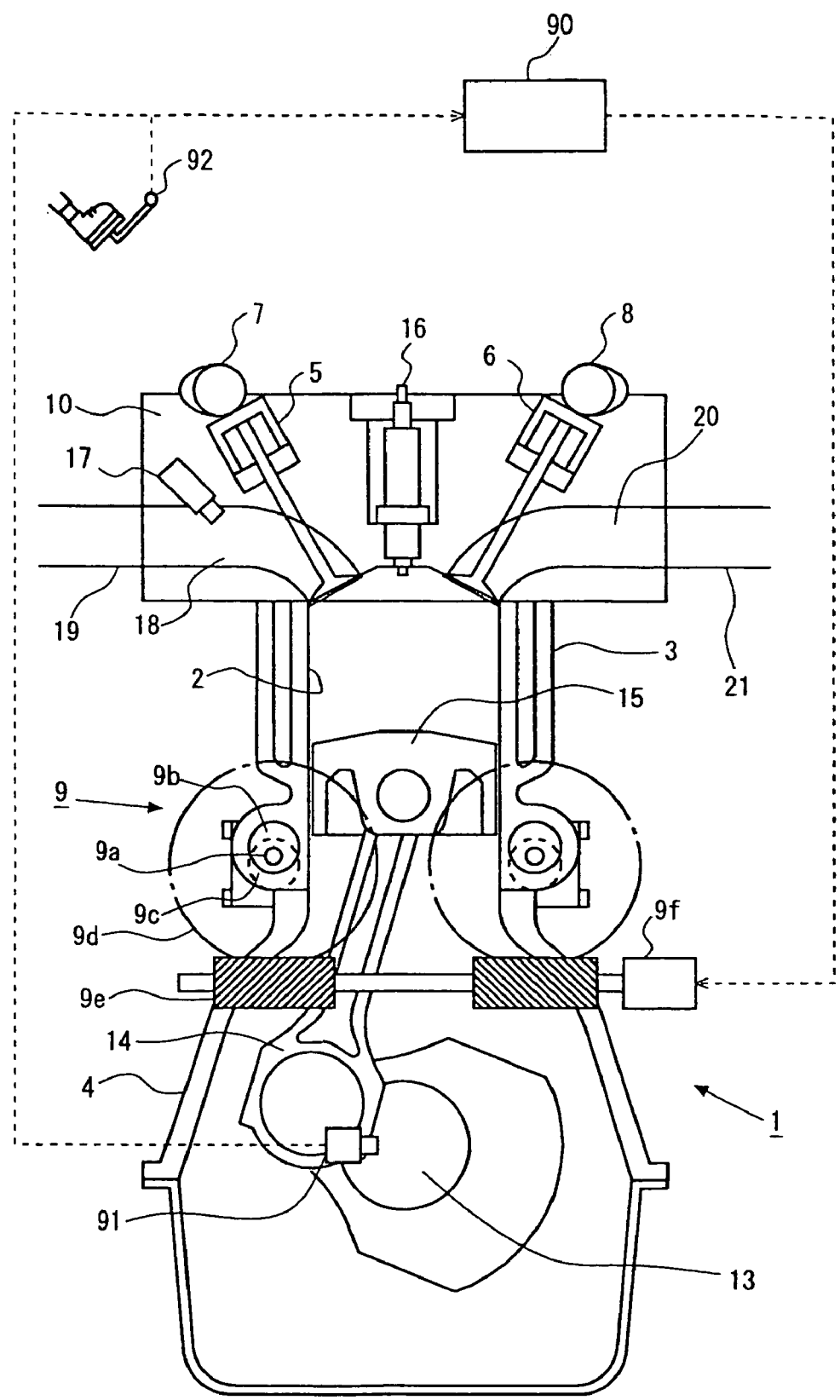
FIG. 1 shows the basic structure of a variable compression ratio internal combustion engine to which a mount apparatus for a variable compression ratio internal combustion engine according to an embodiment of the present invention is applied.

FIG. 1 shows the basic structure of a variable compression ratio internal combustion engine 1 in which the compression ratio can be varied (which will be simply referred to as "internal combustion engine" hereinafter). In this embodiment, in order to show the internal combustion engine 1 in a simple manner, illustration of some of its components are omitted. To the combustion chamber in a cylinder 2, an intake pipe 19 is connected via an intake port 18 provided in a cylinder head 10. The flow of intake air into the cylinder 2 is regulated by an intake valve 5. Opening/closing of the intake valve 5 is controlled by rotationally driving an intake side cam 7. An exhaust pipe 21 is also connected to the combustion chamber via an exhaust port 20 provided in the cylinder head 10. Discharge of exhaust gas to the exterior of the cylinder 2 is controlled by an exhaust valve 6. Opening/closing of the exhaust valve 6 is controlled by rotationally driving an exhaust side cam 8. Furthermore, a fuel injection valve 17 is provided on the intake port 18, and an ignition plug 16 is provided on the top portion of the cylinder 2. A piston 15, which is linked with a crankshaft 13 of the internal combustion engine 1 by means of a connection rod 14, moves back and forth in the cylinder 2.

In this internal combustion engine 1, the compression ratio of the internal combustion engine 1 is varied by moving the cylinder block 3 relative to a crankcase 4 along the axial direction of the cylinder 2 by a variable compression ratio mechanism 9. In other words, by displacing the cylinder block 3 together with the cylinder head 10 in the axial direction of the cylinder 2 relative to the crankcase 4, the volume of the combustion chamber constituted by the cylinder block 3, the cylinder head 10 and the piston 15 is varied, whereby the compression ratio of the internal combustion engine 1 is variably controlled accordingly. For example, when the cylinder block 3 is relatively displaced away from the crankcase 4, the combustion chamber volume is increased, and the compression ratio is decreased.

The variable compression ratio mechanism 9 is composed of a shaft portion 9a, a cam portion 9b having a perfect circular cam profile and fixedly mounted on the shaft portion 9a eccentrically to the center axis thereof, a movable bearing portion 9c having the same outer profile as the cam portion 9b and rotatably mounted on the shaft portion 9a in an eccentric way similar to the cam portion 9b, a worm wheel 9d provided coaxially with the shaft portion 9a, a worm 9e meshing with the worm wheel 9d, and a motor 9f for rotationally driving the worm 9e. The cam portion 9b is accommodated in a accommodation bore provided in the cylinder block 3. The movable bearing portion 9c is set in an accommodation bore provided in the crankcase 4. The motor 9f is fixed on the cylinder block 3 and moves integrally with the cylinder block 3. Driving force from the motor 9f is transmitted to the shaft portion 9a via the worm 9e and the worm wheel 9d. By driving the cam portion 9b and the movable bearing portion 9c that are eccentrically provided, the cylinder block 3 is moved along the axial direction of the cylinder 2 relative to the crankcase 4, whereby the compression ratio is varied.

To the internal combustion engine 1, an electronic control unit (which will be hereinafter referred to as "ECU") 90 for controlling the internal combustion engine 1 is annexed. The ECU 90 has a ROM, RAM and the like that stores various programs and maps in addition to a CPU. The ECU 90 is a unit that controls the running state etc. of the internal combustion engine 1 in accordance with running conditions of the internal combustion engine 1 and driver's demands.

An accelerator pedal position sensor 92 is electrically connected with the ECU 90. The ECU 90 receives a signal indicative of the degree of opening of the accelerator and computes the required engine load of the internal combustion engine 1 etc. A crank position sensor 91 is electrically connected with the ECU 90. The ECU 90 receives a signal indicative of the rotational angle of the output shaft of the internal combustion engine 1 and computes the engine speed of the internal combustion engine 1 and the speed of the vehicle on which the internal combustion engine 1 is mounted based on the engine speed and the gear ratio etc.

Furthermore, the motor 9f that constitutes the variable compression ratio mechanism 9 is electrically connected to the ECU 90. The motor 9f is driven based on a command from the ECU 90, so that the compression ratio of the internal combustion engine 1 is varied by the variable compression ratio mechanism 9. The compression ratio of the internal combustion engine 1 is varied based on the running condition of the internal combustion engine 1. For example, in the case where the running condition of the internal combustion engine 1 is represented by the engine load and the engine speed, as the engine load changes from a low engine load to a high engine load, or as the engine speed changes from a low engine speed to a high engine speed, the motor 9f is driven in such a direction to bring the cylinder block 3 away from the crankcase 4 to vary the compression ratio of the internal combustion engine 1 from a high compression ratio to a low compression ratio.

Figure 2:
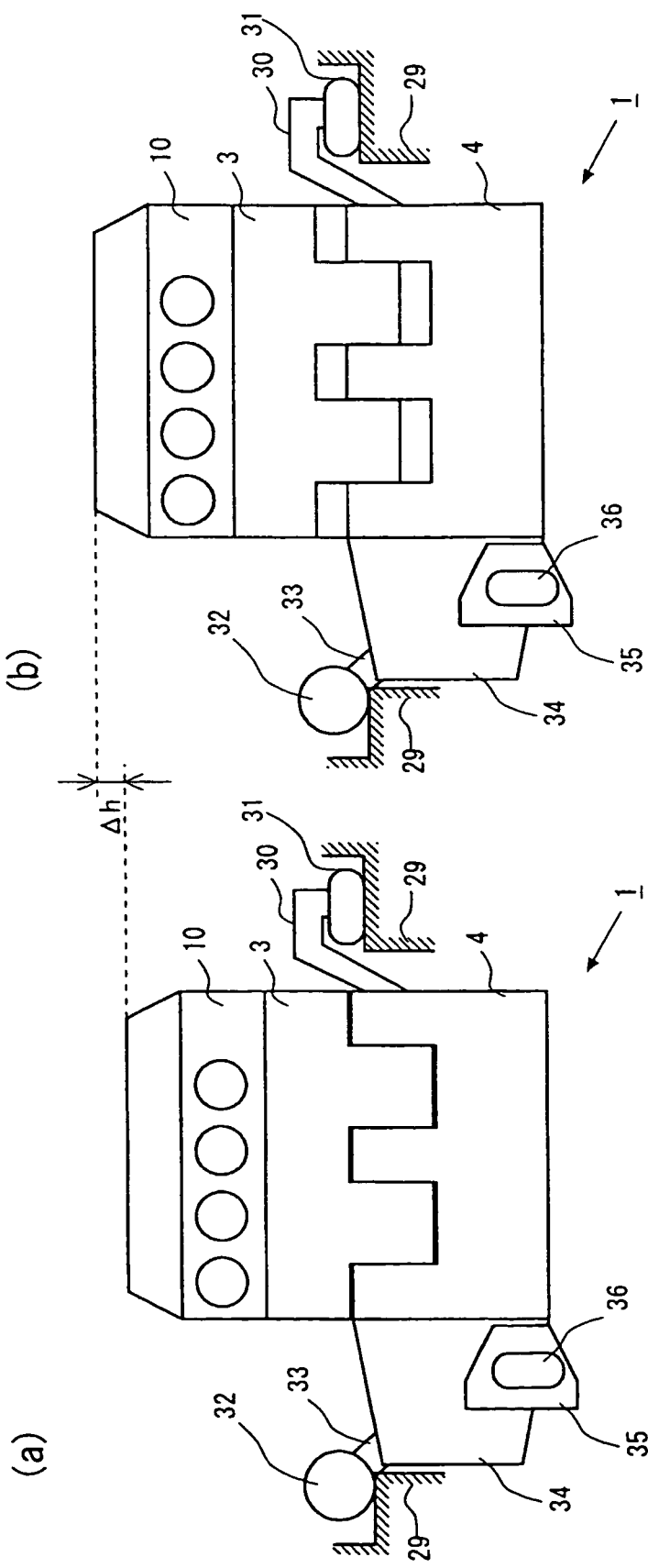
FIG. 2 a first drawing showing how the compression ratio of the variable compression ratio internal combustion engine is changed in a first embodiment of the present invention.

Next, a way of mounting the internal combustion engine 1 to a vehicle of what is called a front-engine front-drive type (which will be simply referred to as "vehicle" hereinafter) on which the internal combustion engine 1 is to be mounted will be described with reference to FIGS. 2 and 3. FIG. 2 shows the mount state of the internal combustion engine 1 and how the compression ratio is changed, as seen from the side of the internal combustion engine 1. FIG. 2(a) shows a state in which the cylinder block 3 and the crankcase 4 are relatively close to each other with respect to the axial direction of the cylinder 2 and the internal combustion engine 1 has a relatively high compression ratio (which will be simply referred to as "high compression ratio" hereinafter). FIG. 2(b) shows a state in which the cylinder block 3 and the crankcase 4 are relatively remote from each other with respect to the axial direction of the cylinder 2 and the internal combustion engine 1 has a relatively low compression ratio (which will be simply referred to as "low compression ratio" hereinafter). As shown in FIG. 2, the compression ratio of the internal combustion engine 1 is changed by relative movement Δh of the cylinder block 3 along the axial direction of the cylinder 2.

Figure 3:
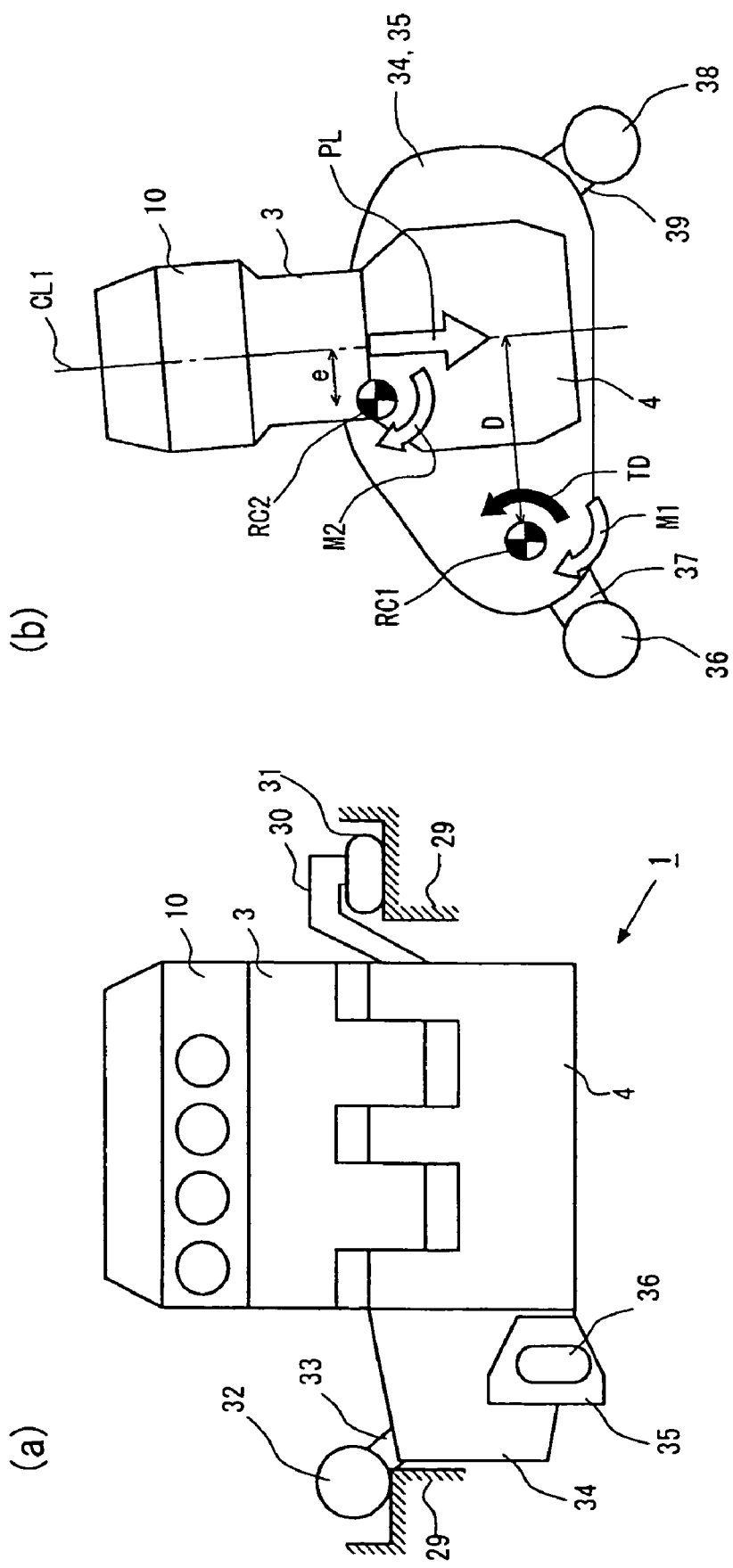
FIG. 3 shows rotation moments about an output shaft and a mount axis upon changing the compression ratio in the mount apparatus for a variable compression ratio internal combustion engine according to the first embodiment of the present invention.

FIG. 3 shows forces and rotation moments acting on the internal combustion engine 1 when the compression ratio of the internal combustion engine 1 is changed from the high compression ratio side to the low compression ratio side. FIG. 3(a) shows the mount state of the internal combustion engine 1 as seen from its side. FIG. 3(b) shows the mount state of the internal combustion engine 1 as seen from its front (i.e. the side on which a later-described transmission apparatus is not provided).

The crankshaft 13 of the internal combustion engine 1 is linked with an intermediate transmission portion 34 including a reduction gear and a forward and backward movement switching mechanism etc. The intermediate transmission portion 34 is linked with a final output portion 35 for a differential gear connected with wheels of the vehicle, so that the engine power of the internal combustion engine 1 is transmitted to the wheels. The final output portion 35 has an output shaft RC1 (shown in FIG. 3(b)) for transmitting the engine power of the internal combustion engine 1. As per the above, the transmission apparatus of the internal combustion engine 1 is composed of the intermediate transmission portion 34 and the final output portion 35.

In the internal combustion engine 1, the cylinder block 3 is mounted on the vehicle body member 29 by means of a mount portion 31 and a mount portion 32 in such a way that the cylinder block 3 is positioned above the crankcase 4. Specifically, the internal combustion engine 1 is connected with the body member 29 of the vehicle by the mount portion 31 via an arm 30 coupled to the crankcase 4 at its front side. In addition, the internal combustion engine 1 is connected with the body member 29 of the vehicle by the mount portion 32 via an arm 33 coupled to the intermediate transmission portion 34 at its rear side. The mount portions 31 and 32 connect the arm 30 and the vehicle body member 29, or the arm 33 and the vehicle body member 29 using a vibration damping member such as an elastic member or a liquid sealed member.

Here, the straight line connecting the mount portion 31 and the mount portion 32 (which line will be referred to as "mount axis" hereinafter) is represented by RC2 in FIG. 3 and constitutes the principal axis of inertia of the driving apparatus of the internal combustion engine 1 composed of the internal combustion engine 1, the intermediate transmission portion 34 and the transmission apparatus of the final output portion 35. The principal axis of inertia is the rotation axis that makes the moment of inertia of the driving apparatus of the internal combustion engine 1 minimum. In the internal combustion engine 1 that is mounted on a vehicle in this way, the internal combustion engine 1 may sometimes vibrate about the mount axis as the rotation center due to rotation of the crankshaft 13 upon combustion or other reasons. However, since the above-mentioned straight line constitutes the principal axis of inertia, vibration of the vehicle due to vibration of the internal combustion engine 1 is suppressed as much as possible.

On sides of the internal combustion engine 1, a stopper 36 and a stopper 38 are provided via an arm 37 and an arm 39 that are connected to the intermediate transmission portion 34. The stopper 36 and the stopper 38 are connected with the vehicle body member 29, though not shown in the drawings.

In the internal combustion engine 1 that is mounted on the vehicle in this way, when the engine load changes from a low load to a high load, it is needed to change the compression ratio from a high compression ratio to a low compression ratio in order to avoid knocking. It is preferred that the time required for changing the compression ratio be as short as possible. Here, to change the compression ratio to a lower compression ratio, the cylinder block 3 is moved relatively away from the crankcase 4 by the variable compression ratio mechanism 9. In connection with this, the crankcase 4 is mounted on the vehicle body member 29 by means of the arm 30 and the mount portion 31. Accordingly, when the cylinder block 3 is driven by the variable compression ratio mechanism 9 to move away from the crankcase 4, a force PL pressing the crankcase 4 against the vehicle body member 29 is generated as a reactive force. The force PL acts on the axis CL1 of the cylinder 2 in the downward direction in FIG. 3.

On the other hand, when the engine load of the internal combustion engine becomes high, driving force of the internal combustion engine 1 is transmitted from the output shaft RC1 to wheels of the vehicle. When the driving force is transmitted to the ground, a certain reactive force is transmitted from the ground to the wheels, thereby a rotation moment TD about the output shaft RC1 is generated consequently. In this embodiment, the rotation direction of the rotation moment TD is anticlockwise in FIG. 3(b).

In the internal combustion engine 1 and its transmission apparatus according to this embodiment, the positions of the mount portion 31 and the mount portion 32 are determined in such a way that the output shaft RC1 is located on the left of the axis CL1 with a distance D therefrom and the mount axis RC2 is located on the left of the axis CL1 with a distance e therefrom, as shown in FIG. 3(b).

When the above-mentioned force PL is generated, rotation moments that cause the internal combustion engine 1 and its transmission apparatus to swing about the output shaft RC1 and the mount axis RC2 as rotation centers are generated. In accordance with the positional relationship among the axis CL1, the output shaft RC1 and the mount axis RC2, the rotation direction of the rotation moment M1 (represented by PL×D) about the output shaft RC1 generated by the force PL is clockwise in FIG. 3(b). The rotation direction of the rotation moment M2 (represented by PL×e) about the mount axis RC2 generated by the force PL is clockwise in FIG. 3(b).

As per the above, the rotation direction of the rotation moment TD is opposite to the rotation direction of the rotation moment M1 and the rotation moment M2. By this feature, in the internal combustion engine 1 that is mounted on the vehicle body member 29 by means of the mount portion 31 and the mount portion 32 as with this embodiment, the rotation moments generated upon changing the compression ratio and the rotation moment TD can cancel each other. As a result, vibration of the vehicle can be suppressed more effectively upon changing the compression ratio.

In connection with the above, orientation of the mount portion 31, the mount portion 32 and the internal combustion engine 1 may be arranged in such a way that the rotation direction of the rotation moment TD and either rotation direction of the rotation moment M1 or the rotation direction of the rotation moment M2 become opposite to each other. In other words, orientation of the internal combustion engine 1 may be determined taking into consideration the rotation moment that is generated in accordance with the positions of the mount portion 31 and the mount portion 32, to thereby cause the rotation moment TD and at least one of the rotation moment M1 and the rotation moment M2 cancel each other.

Embodiment 2

Figure 4:
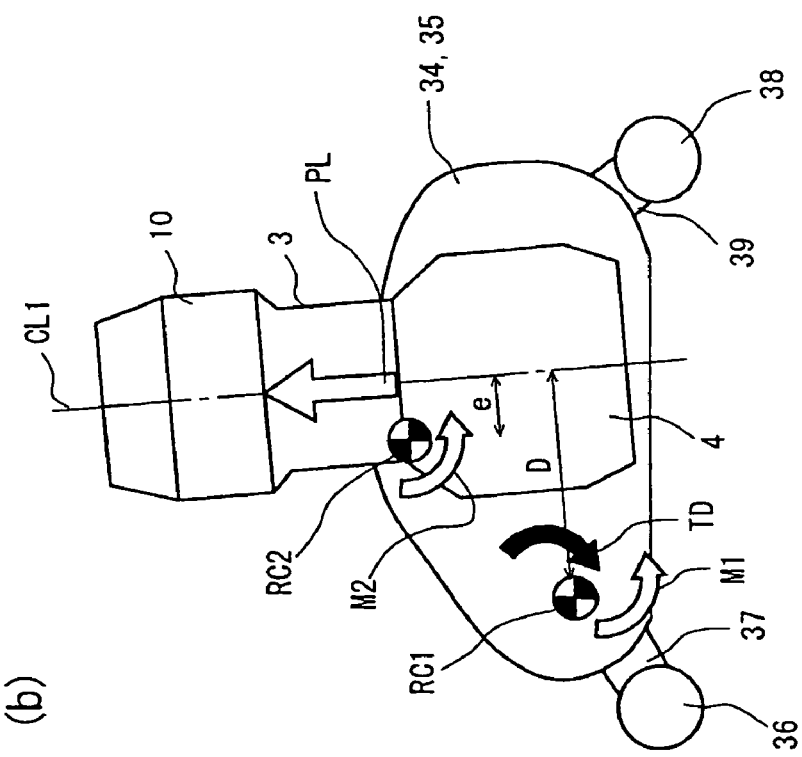
FIG. 4 shows rotation moments about an output shaft and a mount axis upon changing the compression ratio in a mount apparatus for a variable compression ratio internal combustion engine according to a second embodiment of the present invention.
Figure 4:
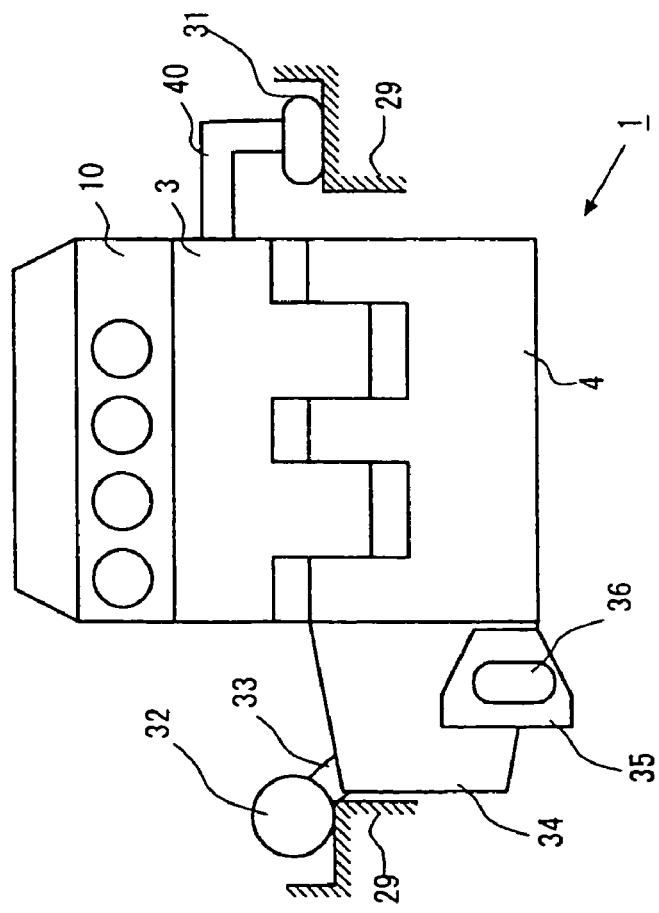

The second embodiment of the mount apparatus for a variable compression ratio internal combustion engine according to the present invention will be described with reference to FIG. 4. The components of the internal combustion engine 1 etc. according to this embodiment same as those in the internal combustion engine 1 etc. shown in FIGS. 1 to 3 will be designated by the same reference numerals, and descriptions thereof will be omitted. FIG. 4 shows forces and rotation moments acting on the internal combustion engine 1 when the compression ratio of the internal combustion engine 1 is shifted from the high compression ratio side to the low compression ratio side, in the same manner as FIG. 3.

In this embodiment, what is different from the above-described first embodiment is that the mount portion 31 is connected with an arm 40 that is linked with the cylinder block 3. Thus, in the internal combustion engine 1 of this embodiment, the compression ratio is changed in a state in which the cylinder block 3 is mounted on the vehicle body member 29. Consequently, changing to a low compression ratio can be achieved easily by utilizing gravitational energy of the crankcase 4 as the cylinder block 3 and the crankcase 4 are moved relatively away from each other.

Here, rotational moments generated about the output shaft RC1 and the mount axis RC2 will be explained in a similar manner as in the first embodiment. In this embodiment, the mount axis RC2 is the line connecting the mount portion 32 and the mount portion 31, and the rotation direction of the rotation moment TD about the output shaft RC1 transmitted from the ground through the wheels is clockwise. In the internal combustion engine 1, when the engine load varies from a low load to a high load, the cylinder block 3 and the crankcase 4 are relatively moved by the variable compression ratio mechanism 9 to decrease the compression ratio. In connection with this, the cylinder block 3 is mounted on the vehicle body member 29 by means of the arm 40 and the mount portion 31. Accordingly, when the crankcase 4 is driven by the variable compression ratio mechanism 9 to move away from the cylinder block 3, a force PL pressing the cylinder block 3 away from the vehicle body member 29 is generated as a reactive force. The force PL acts on the axis CL1 of the cylinder 2 in the upward direction in FIG. 4.

In the internal combustion engine 1 and its transmission apparatus according to this embodiment, the positions of the mount portion 31 and the mount portion 32 are determined in such a way that the output shaft RC1 is located on the left of the axis CL1 with a distance D therefrom and the mount axis RC2 is located on the left of the axis CL1 with a distance e therefrom.

When the above-mentioned force PL is generated, rotation moments that cause the internal combustion engine 1 and its transmission apparatus to swing about the output shaft RC1 and the mount axis RC2 as rotation centers are generated. In accordance with the positional relationship among the axis CL1, the output shaft RC1 and the mount axis RC2, the rotation direction of the rotation moment M1 (represented by PL×D) about the output shaft RC1 generated by the force PL is anticlockwise in FIG. 4(b). The rotation direction of the rotation moment M2 (represented by PL×e) about the mount axis RC2 generated by the force PL is anticlockwise in FIG. 4(b).

As per the above, the rotation direction of the rotation moment TD is opposite to the rotation direction of the rotation moment M1 and the rotation moment M2. By this feature, in the internal combustion engine 1 that is mounted on the vehicle body member 29 by means of the mount portion 31 and the mount portion 32 as with this embodiment, the rotation moments generated upon changing the compression ratio and the rotation moment TD can cancel each other. As a result, vibration of the vehicle can be suppressed more efficiently upon changing the compression ratio.

In connection with the above, orientation of the mount portion 31, the mount portion 32 and the internal combustion engine 1 may be arranged in such a way that the rotation direction of the rotation moment TD and either rotation direction of the rotation moment M1 or the rotation direction of the rotation moment M2 become opposite to each other. In other words, orientation of the internal combustion engine 1 may be determined taking into consideration the rotation moment that is generated in accordance with the positions of the mount portion 31 and the mount portion 32, to thereby cause the rotation moment TD and at least one of the rotation moment M1 and the rotation moment M2 to cancel each other.

Embodiment 3

Figure 5:
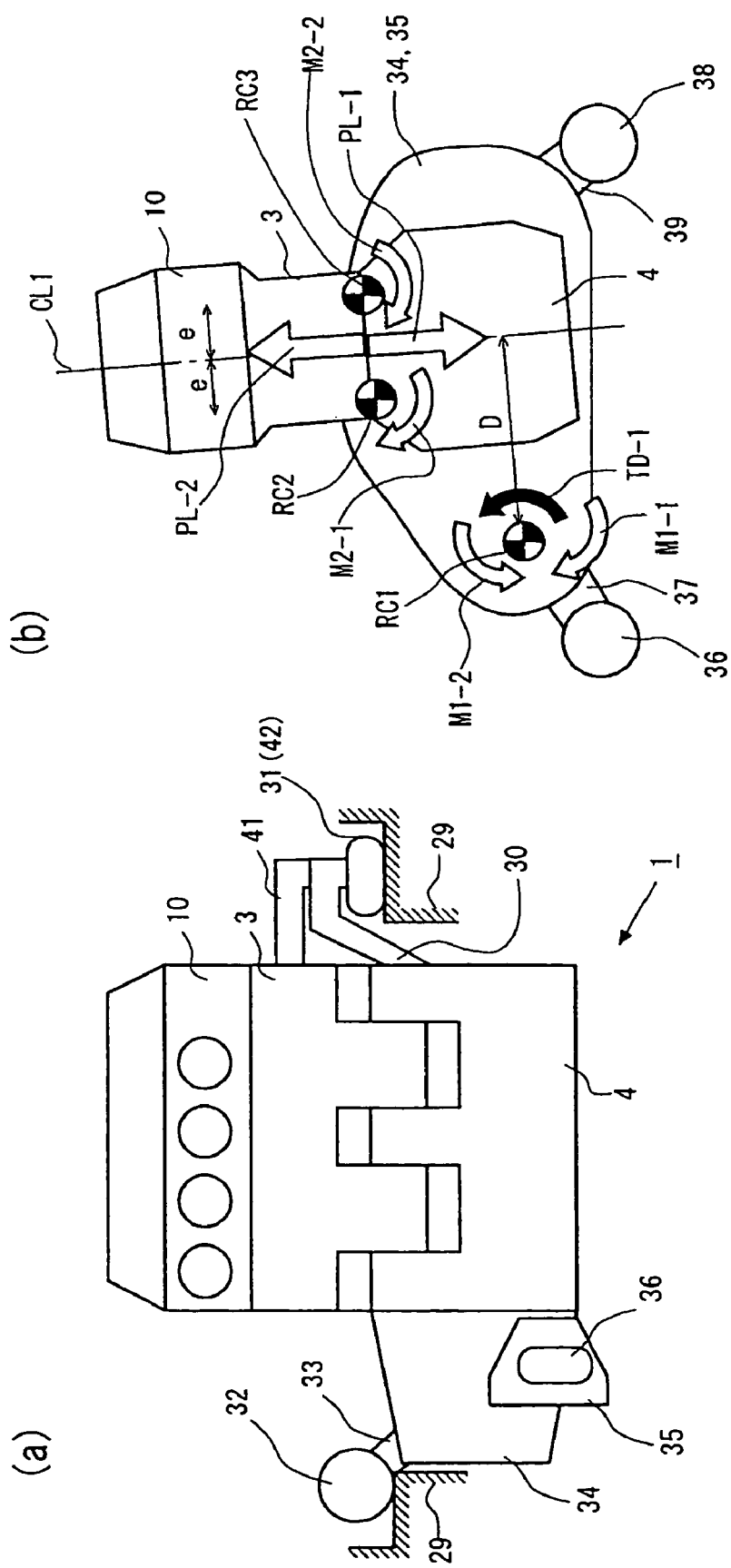
FIG. 5 shows rotation moments about an output shaft and a mount axis upon changing the compression ratio in a mount apparatus for a variable compression ratio internal combustion engine according to a third embodiment of the present invention.

The third embodiment of the mount apparatus for a variable compression ratio internal combustion engine according to the present invention will be described with reference to FIG. 5. The components of the internal combustion engine 1 etc. according to this embodiment same as those in the internal combustion engine 1 etc. shown in FIGS. 1 to 4 will be designated by the same reference numerals, and descriptions thereof will be omitted. FIG. 5 shows forces and rotation moments acting on the internal combustion engine 1 when the compression ratio of the internal combustion engine is changed from the high compression ratio side to the low compression ratio side, in the same manner as FIG. 3.

In mounting the internal combustion engine 1 according to this embodiment to the vehicle body member 29 at its front side, it is mounted on the vehicle body member 29 by a mount portion 31 via an arm 30 connected to the crankcase 4, and in addition, it is mounted on the vehicle body member 29 by a mount portion 42 via an arm 41 connected to the cylinder block 3. Specifically, in the internal combustion engine 1 according to this embodiment, both the cylinder block 3 and the crankcase 4 are mounted on the vehicle body member 29, and in that state the compression ratio is changed by relative movement of the cylinder block 3 and the crankcase 4 within the range of elastic deformation of the mount portion 31 and the mount portion 42. Consequently, the load on one of the mount portions is lightened and changing to a low compression ratio can be achieved easily by utilizing gravitational energy of the crankcase 4 as the cylinder block 3 and the crankcase 4 are moved relatively away from each other.

The mount axis, designated by RC2 in FIG. 5, as a straight line connecting the mount portion 31 and the mount portion 32 will be referred to as the first mount axis, only in this embodiment. In addition, in this embodiment, the straight line connecting the mount portion 32 and the mount portion 42 will be referred to as the second mount axis, which is designated by RC3 in FIG. 5. The first mount axis RC2 constitutes the principle axis of inertia of the internal combustion engine 1 and its transmission apparatus as is the case with the first embodiment.

Here, rotational moments generated about the output shaft RC1, the first mount axis RC2 and the second mount axis RC3 will be explained. In this embodiment, the rotation direction of the rotation moment TD about the output shaft RC1 that is transmitted from the ground through the wheels is assumed to be anticlockwise. In the internal combustion engine 1, when the engine load varies from a low load to a high load, the cylinder block 3 and the crankcase 4 are relatively moved by the variable compression ratio mechanism 9 to decrease the compression ratio. In connection with this, the cylinder block 3 and the crankcase 4 are mounted on the vehicle body member 29 by means of the respective arms 30, 41 and the respective mount portions 31, 42. Accordingly, when the cylinder block 3 and the crankcase 4 are relatively moved within the elastic deformation range of the mount portion 31 and the mount portion 41, a force PL-1 pressing the crankcase 4 against the vehicle body member and a force PL-2 pressing the cylinder block 3 away from the vehicle body member 29 are generated. The force PL-1 acts on the axis CL1 of the cylinder 2 in the downward direction, and the force PL-2 acts on the axis CL1 of the cylinder 2 in the upward direction in FIG. 5.

In the internal combustion engine 1 and its transmission apparatus according to this embodiment, the positions of the mount portion 31, the mount portion 32 and the mount portion 42 are determined in such a way that the output shaft RC1 is located on the left of the axis CL1 with a distance D therefrom, the first mount axis RC2 is located on the left of the axis CL1 with a distance e therefrom, and the second mount axis RC3 is located on the right of the axis CL1 with a distance e therefrom.

When the above-mentioned forces PL-1 and PL-2 are generated, rotation moments that cause the internal combustion engine 1 and its transmission apparatus to swing about the output shaft RC1, the first mount axis RC2 and the second mount axis RC3 as rotation centers are generated. In accordance with the positional relationship among the axis CL1, the output shaft RC1, the first mount axis RC2 and the second mount axis RC3, the rotation direction of the rotation moment M1-1 (represented by PL-1×D) about the output shaft RC1 generated by the force PL-1 is clockwise in FIG. 5(b). The rotation direction of the rotation moment M1-2 (represented by PL-2×D) about the output shaft RC1 generated by the force PL-2 is anticlockwise in FIG. 5(b).

On the other hand, the rotation direction of the rotation moment M2-1 (represented by PL-1×e) about the first mount axis RC2 generated by the force PL-1 is clockwise in FIG. 5(b). The rotation direction of the rotation moment M2-2 (represented by PL-2×e) about the second mount axis RC3 generated by the force PL-2 is clockwise in FIG. 5(b).

As per the above, the rotation direction of the rotation moment TD is the same as the rotation moment M1-2, but opposite to the rotation direction of the rotation moment M1-1, the rotation moment M2-1 and the rotation moment M2-2. Thus, in the internal combustion engine 1 that is mounted on the vehicle body member 29 by means of the mount portion 31, the mount portion 32 and the mount portion 42 as with this embodiment, a part of the rotation moments generated upon changing the compression ratio and the rotation moment TD can cancel each other. As a result, vibration of the vehicle can be suppressed more efficiently upon changing the compression ratio.

In connection with the above, orientation of the mount portion 31, the mount portion 32 and the internal combustion engine 1 may be arranged in such a way that the rotation direction of the rotation moment TD and the rotation direction of at least one of the rotation moments M1-1, M1-2, M2-1 and M2-2 become opposite to each other. In other words, orientation of the internal combustion engine 1 may be determined taking into consideration the rotation moment that is generated in accordance with the positions of the mount portion 31 and the mount portion 32, to thereby cause the rotation moment TD and at least one of the rotation moments M1-1, M1-2, M2-1 and M2-2 to cancel each other.

Embodiment 4

Figure 6:
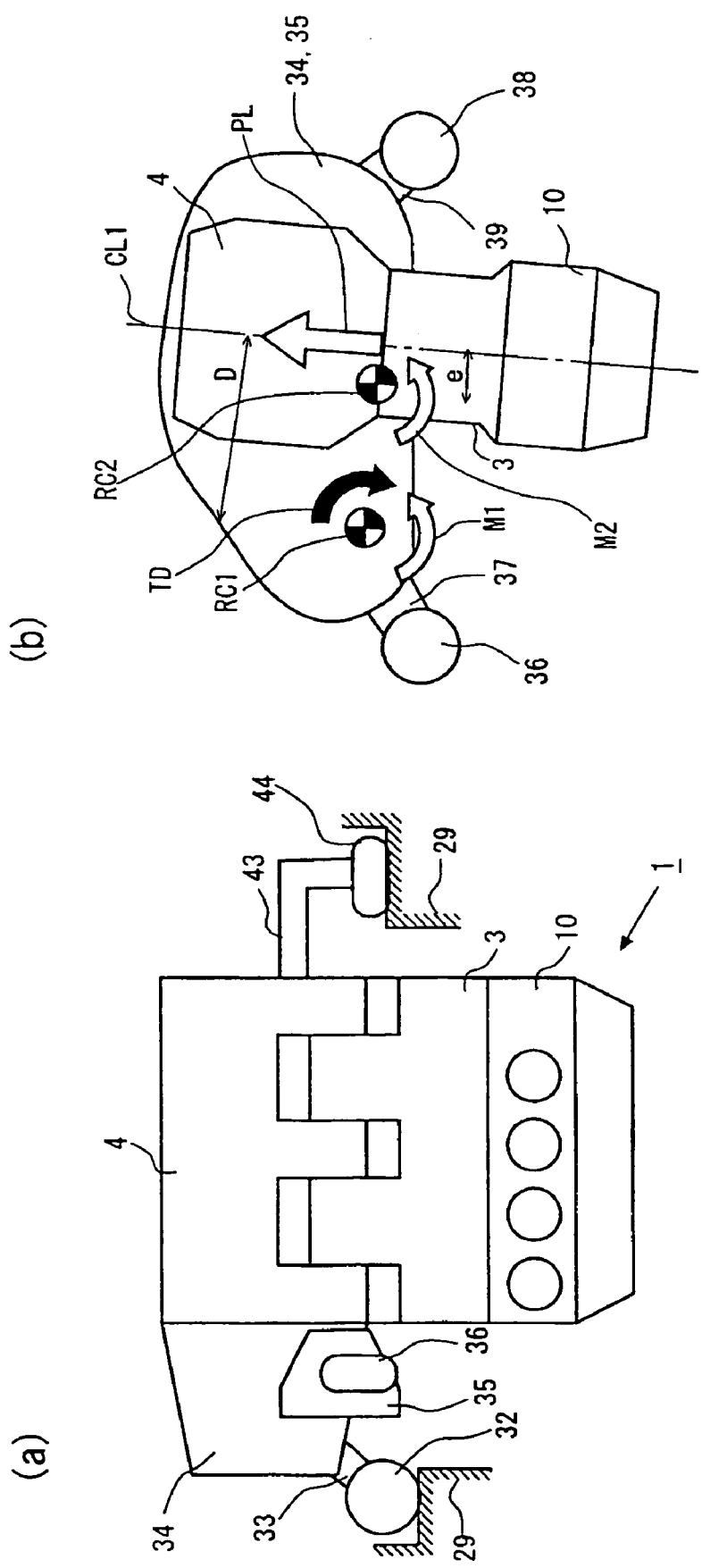
FIG. 6 shows rotation moments about an output shaft and a mount axis upon changing the compression ratio in a mount apparatus for a variable compression ratio internal combustion engine according to a fourth embodiment of the present invention.

The fourth embodiment of the mount apparatus for a variable compression ratio internal combustion engine according to the present invention will be described with reference to FIG. 6. The components of the internal combustion engine 1 etc. according to this embodiment same as those in the internal combustion engine 1 etc. shown in FIGS. 1 to 4 will be designated by the same reference numerals, and descriptions thereof will be omitted. FIG. 6 shows forces and rotation moments acting on the internal combustion engine 1 when the compression ratio of the internal combustion engine 1 is changed from the high compression ratio side to the low compression ratio side, in the same manner as FIG. 3.

The way of mounting the internal combustion engine 1 according to this embodiment on the vehicle body member 29 at its front side is different from the above-described the first to third embodiments, and it is mounted on the vehicle body member 29 by a mount portion 44 via an arm 43 connected to the crankcase 4 in a state in which the crankcase 4 is located above the cylinder block 3. Thus, in the internal combustion engine 1 according to this embodiment, since the compression ratio is varied in a state in which the crankcase 4 is mounted on the vehicle body member 29, changing to a low compression ratio can be achieved easily without changing the position of the crankcase 4 and the transmission apparatus, by utilizing gravitational energy of the cylinder block 3 as the cylinder block 3 and the crankcase 4 are moved relatively away from each other.

The mount axis or the straight line connecting the mount portion 44 and the mount portion 32 in this embodiment is designated by RC2 in FIG. 6. The mount axis RC2 constitutes the principal axis of inertia of the internal combustion engine 1 and its transmission apparatus, as is the case with the first embodiment.

Here, rotational moments generated about the output shaft RC1 and the mount axis RC2 will be explained. In this embodiment, the rotation direction of the rotation moment TD about the output shaft RC1 that is transmitted from the ground through the wheels is assumed to be clockwise. In the internal combustion engine 1, when the engine load varies from a low load to a high load, the cylinder block 3 and the crankcase 4 are relatively moved by the variable compression ratio mechanism 9 to decrease the compression ratio. In connection with this, the crankcase 4 is mounted on the vehicle body member 29 by means of the arm 43 and the mount portion 44. Accordingly, when the cylinder block 3 is driven by the variable compression ratio mechanism 9 to move away from the crankcase 4, a force PL pressing the crankcase 4 away from the vehicle body member 29 is generated as a reactive force. The force PL acts on the axis CL1 of the cylinder 2 in the upward direction in FIG. 6.

In the internal combustion engine 1 and its transmission apparatus according to this embodiment, the positions of the mount portion 32 and the mount portion 44 are determined in such a way that the output shaft RC1 is located on the left of the axis CL1 with a distance D therefrom and the mount axis RC2 is located on the left of the axis CL1 with a distance e therefrom.

When the above-mentioned force PL is generated, rotation moments that cause the internal combustion engine 1 and its transmission apparatus to swing about the output shaft RC1 and the mount axis RC2 as rotation centers are generated. In accordance with the positional relationship among the axis CL1, the output shaft RC1 and the mount axis RC2, the rotation direction of the rotation moment M1 (represented by PL×D) about the output shaft RC1 generated by the force PL is anticlockwise in FIG. 6(b). The rotation direction of the rotation moment M2 (represented by PL×e) about the mount axis RC2 generated by the force PL is anticlockwise in FIG. 6(b).

As per the above, the rotation direction of the rotation moment TD is opposite to the rotation direction of the rotation moment M1 and the rotation moment M2. By this feature, in the internal combustion engine 1 that is mounted on the vehicle-body member 29 by means of the mount portion 44 and the mount portion 32 as with this embodiment, the rotation moments generated upon changing the compression ratio and the rotation moment TD can cancel each other. As a result, vibration of the vehicle can be suppressed more efficiently upon changing the compression ratio.

In connection with the above, orientation of the mount portion 31, the mount portion 32 and the internal combustion engine 1 may be arranged in such a way that the rotation direction of the rotation moment TD and either rotation direction of the rotation moment M1 or the rotation direction of the rotation moment M2 become opposite to each other. In other words, orientation of the internal combustion engine 1 may be determined taking into consideration the rotation moment that is generated in accordance with the positions of the mount portion 31 and the mount portion 32, to thereby cause the rotation moment TD and at least one of the rotation moments M1 and the rotation moment M2 to cancel each other.

INDUSTRIAL APPLICABILITY

As per the above, specific modes of the mount apparatus for mounting on a vehicle body member a variable compression ratio internal combustion engine in which the compression ratio can be varied by moving the cylinder block and the crankcase along the axial direction of the cylinder relative to each other have been proposed, and it is possible to provide a mount apparatus that can suppress vibration of the vehicle more efficiently.

The invention claimed:

1. A mount apparatus for mounting a variable compression ratio internal combustion engine in which the compression ratio can be varied by moving a cylinder block and a crankcase relatively along the axial direction of a cylinder on a vehicle body member, wherein:

said variable compression ratio internal combustion engine is mounted on said vehicle body member by at least two portions including a first mount portion provided on a transmission apparatus to which a crankshaft is linked and a second mount portion provided on the variable compression ratio internal combustion engine in a state in which said cylinder block is located above said crankcase; and said second mount portion is provided on said crankcase, wherein the variable compression ratio internal combustion engine is mounted on the vehicle body member such that the cylinder block moves relative to the vehicle body member a greater distance than the crankcase moves relative to the vehicle body member, when the compression ratio is varied, wherein a variable compression ratio mechanism comprises:

a shaft portion;

a cam portion having a circular cam profile fixedly mounted on the shaft portion eccentrically to the center axis of the shaft portion, the cam portion being accommodated in an accommodation bore provided in the cylinder block; and a movable bearing portion having a same outer profile as the cam portion rotatably mounted on the shaft portion in an eccentric way similar to the cam portion, the movable bearing portion being set in an accommodation bore provided in the crankcase, and wherein, by driving the cam portion and the movable bearing portion that are eccentrically provided, the cylinder block is moved along the axial direction of the cylinder relative to the crankcase to vary the compression ratio.

2. A mount apparatus for a variable compression ratio internal combustion engine according to claim 1, wherein orientation of said first mount portion, said second mount portion and said variable compression ratio internal combustion engine is arranged in such a way that the direction of a rotation moment about an output shaft of said transmission apparatus that is generated upon combustion in the cylinder in said variable compression ratio internal combustion engine to act on the variable compression ratio internal combustion engine becomes opposite to the direction of a rotation moment about said output shaft generated by a force that acts on either said cylinder block or said crankcase on which said second mount portion is provided on a specific occasion of changing the compression ratio of said variable compression ratio internal combustion engine.

3. A mount apparatus for a variable compression ratio internal combustion engine according to claim 2, wherein said specific occasion of changing the specific compression ratio is an occasion on which the compression ratio is decreased by moving said cylinder block relatively away from said crankcase.

4. A mount apparatus for a variable compression ratio internal combustion engine according to claim 2, wherein said variable compression ratio internal combustion engine is an internal combustion engine for driving a vehicle of a front-engine front-drive type.

5. A mount apparatus for a variable compression ratio internal combustion engine according to claim 1, wherein orientation of said first mount portion, said second mount portion and said variable compression ratio internal combustion engine is arranged in such a way that the direction of a rotation moment about an output shaft of said transmission apparatus that is generated upon combustion in the cylinder in said variable compression ratio internal combustion engine to act on the variable compression ratio internal combustion engine becomes opposite to the direction of a rotation moment about a mount axis connecting said first mount portion and said second mount portion generated by a force that acts on either said cylinder block or said crankcase on which said second mount portion is provided on a specific occasion of changing the compression ratio of said variable compression ratio internal combustion engine.

6. A mount apparatus for a variable compression ratio internal combustion engine according to claim 1, wherein the line connecting said first mount portion and said second mount portion constitutes a principal axis of inertia that makes the moment of inertia of a drive apparatus composed of said variable compression ratio internal combustion engine and said transmission apparatus minimum or lies within a predetermined range from said principal axis of inertia.

* * * * *